C. HIGBY.
POST HOLE DIGGER.
APPLICATION FILED AUG. 19, 1915.
1,187,316. Patented June 13, 1916.
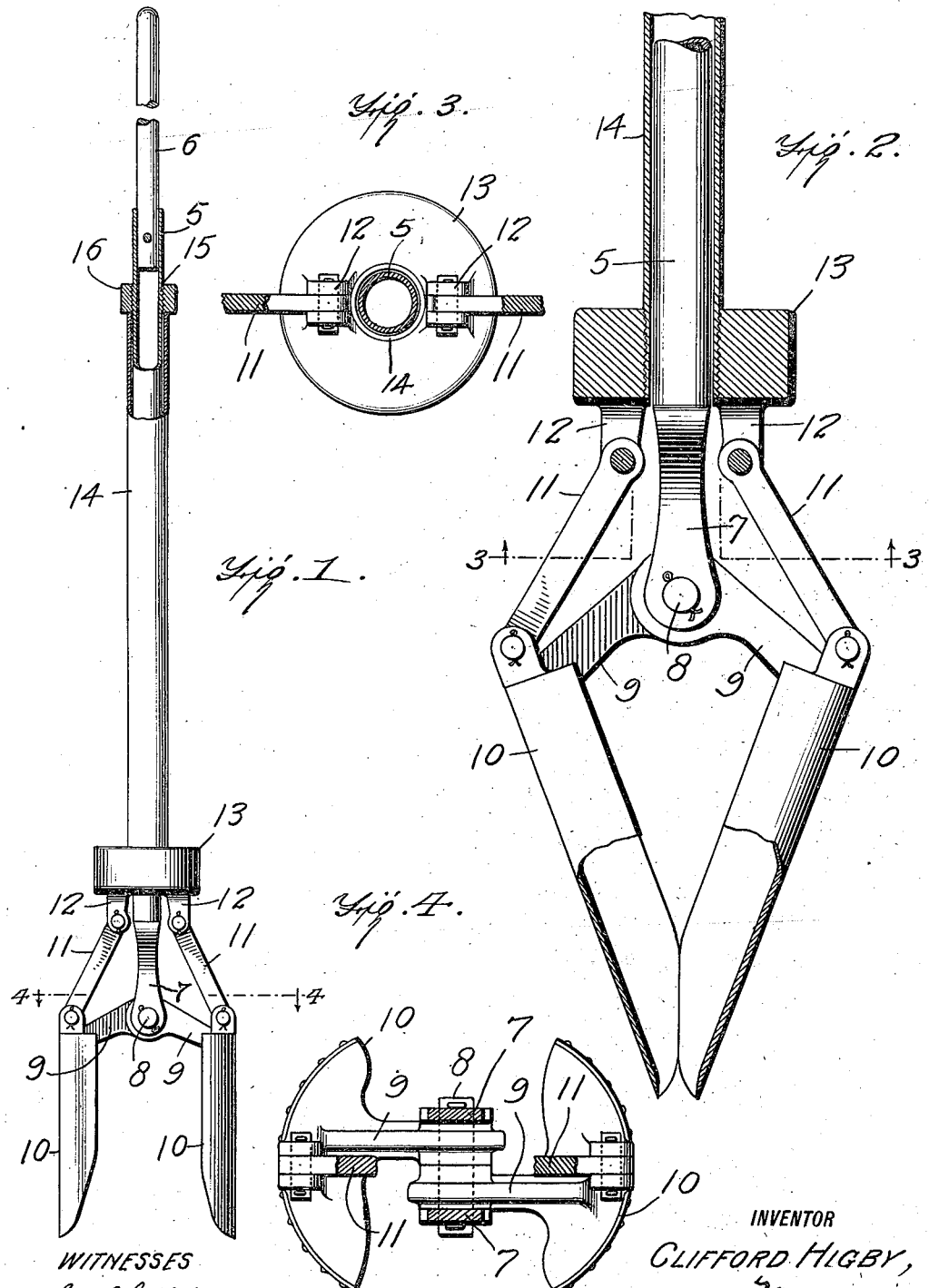
INVENTOR
Clifford Higby,
BY Munn & Co.
ATTORNEYS
WITNESSES

UNITED STATES PATENT OFFICE.

CLIFFORD HIGBY, OF IDAHO CITY, IDAHO.

POST-HOLE DIGGER.

1,187,316.  Specification of Letters Patent.  Patented June 13, 1916.

Application filed August 19, 1915. Serial No. 46,282.

*To all whom it may concern:*

Be it known that I, CLIFFORD HIGBY, a citizen of the United States, and a resident of Idaho City, in the county of Boise and State of Idaho, have invented an Improvement in Post-Hole Diggers, of which the following is a specification.

This invention is an improvement in excavating devices and has particular reference to a post hole digger.

An object of the invention is the provision of pivoted coöperating scoop members which are normally in closed relation and with which weighted means are associated to cause said members to open during the projection thereof toward the ground so that the scoops will be in open position before entering the ground, said weighted means being also adapted to facilitate the entry of said scoop members.

Another object of the invention is to provide a weighted sleeve slidably mounted upon the handle portion of the device and coöperating with the scoop members so that the same may be forced toward their closing position when excavating a portion of the soil and which may also be operated to open said scoop members to dump the contents thereof.

A further object is the provision of a device of this character which is simple in construction and therefore easy to manufacture and which is also durable and effective in carrying out the purpose for which it is designed.

The inventive idea involved is capable of receiving a variety of mechanical expressions, one of which, for the purpose of illustrating the invention, is shown in the accompanying drawings, in which—

Figure 1 is a side elevation of the device partly broken away and shown in section, the scoop members thereof being in open position. Fig. 2 is an enlarged fragmentary sectional view of the device showing the scoop members in closed position. Fig. 3 is a section on the line 3—3 of Fig. 2. Fig. 4 is a section on the line 4—4 of Fig. 1.

Referring more particularly to the accompanying drawing, the numeral 5 indicates a hollow supporting rod in the upper end of which is mounted a suitable handle 6. The lower end 7 of the rod is flattened and has mounted therein a bearing 8 upon which are pivoted the inner ends of a pair of coöperating levers 9, the outer end of each lever being preferably made integral with the upper end of a scoop member 10 which is arcuate in cross section and of ordinary construction. To the upper end of each lever is pivoted one end of a link connection 11 the other end of which is pivoted to a lug 12 carried by a weight 13 which is threaded upon the lower end of a sleeve 14 which is slidably mounted upon the rod 5. Adjacent the upper end of the rod 5 the same is preferably threaded as indicated at 15 to receive a stop 16 in the form of a collar which is adapted to limit the relative movement between the sleeve 14 and the rod 5, said sleeve being adapted to contact with said stop when the scoop members are in their open position as shown in Fig. 1.

In practice, the device is adapted to be plunged or projected into the ground and before so doing the parts are in the position shown in Fig. 2 with the scoop members closed. This position is assumed by reason of the weight 13 which forces the links 11 outwardly and the lower ends of the scoop members together. By grasping the handle 6 and elevating the device a short distance above the ground and then plunging the same downwardly the initial force will be transmitted through the rod 5 to the pivot 8 which will cause the pivoted ends of the levers 9 to move downwardly thus spreading the scoop members to open position. This spreading of the members 10 is accomplished before the same enter the ground and the movement toward open position is limited by contact of the upper end of the sleeve member 14 with the stop 16 so that in their extreme open position the scoops 10 are parallel. After the scoops 10 strike the ground the weight 13 will facilitate the entry thereof and also have a tendency to force the same toward their closing position by reason of the relative movement between said weight and the rod 5. When the scoops 10 have been sufficiently embedded the sleeve 14 may be forced downwardly or the handle 6 pulled upwardly so that the scoop members will be forced toward each other as much as possible in order to secure a firm grip upon the earth therebetween. The device may then be withdrawn after which the sleeve 14 may again be moved along the rod 5 toward the handle 6 in order to spread the scoop members whereby to dump the earth therein.

What is claimed is:—

1. In an excavating device, the combination of a supporting rod, scoop members pivoted thereto, a sleeve slidable on said rod, a weight carried by one end of said sleeve, and links pivotally connecting said weight with said scoop members.

2. In an excavating device, the combination of a supporting rod, scoop members pivoted thereto, a sleeve slidable on said rod, a weight carried by one end of said sleeve, links pivotally connecting said weight with said scoop members, and a stop carried by said rod for limiting the sliding movement of said sleeve.

3. In an excavating device, the combination of a plurality of scoop members, and weighted means associated therewith to cause the same to open during the projection thereof toward the ground and before contacting therewith.

4. In an excavating device, the combination of a plurality of scoop members, a support therefor, and a weight movable relative to said support for opening said scoop members when the same are projecting toward the ground.

5. In an excavating device, the combination of a plurality of scoop members, a support therefor, a weight movable relative to said support for opening said scoop members when the same are projecting toward the ground, and means for limiting said relative movement.

CLIFFORD HIGBY.

Witnesses:
C. B. MOSHER,
O. M. PRESTIGARD.